Patented Mar. 20, 1934

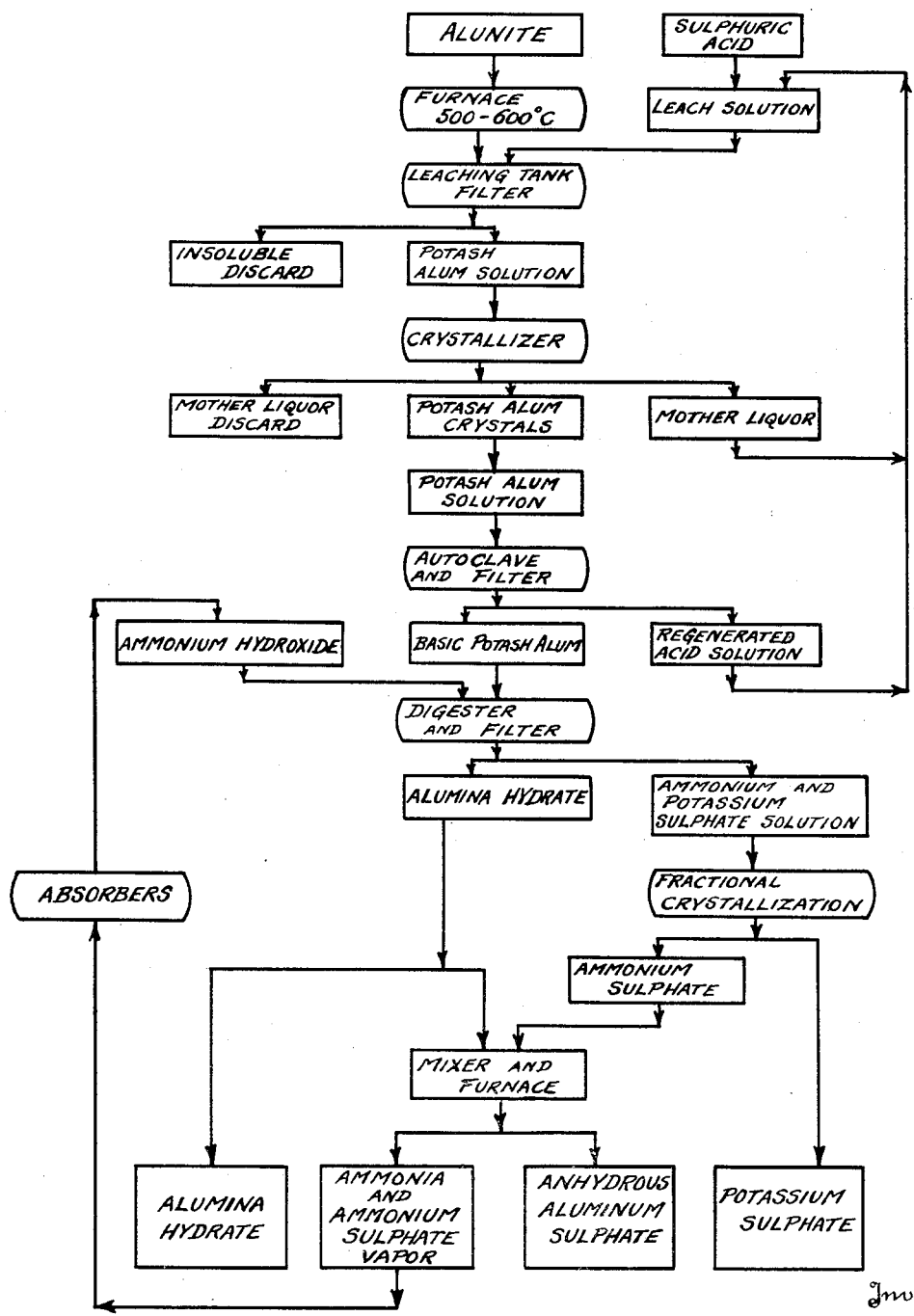

1,951,443

UNITED STATES PATENT OFFICE 1,951,443

METHOD OF MANUFACTURING ALUMINA HYDRATE AND VALUABLE SULPHATES FROM COMPOUNDS OF ALUMINA

Walter Murray Sanders, deceased, late of Montclair, N. J., by Louise D. Sanders, administratrix, Montclair, N. J., assignor, by mesne assignments, to Kalunite Company, a corporation of Delaware Application April 22, 1932, Serial No. 606,908

6 Claims. (Cl. 23—143)

This invention relates to a process for producing from compounds of alumina at comparatively low cost a pure alumina hydrate, alumina, an anhydrous alumina sulphate and in certain cases sulphates of potash, soda and ammonia. While the invention may be said to be intended to be used in the treatment of ores or compounds of aluminum for the production therefrom of pure alumina hydrate and alumina and valuable sulphates, in its broadest sense the invention consists of a process for treating a pure basic aluminum alum, that is to say, a basic alum consisting of a basic aluminum sulphate in combination with sulphates of potash, soda or ammonia, or two or more of such alkali sulphates. The basic alum should, for efficient treatment by the process, be finely divided and the process consists in treating finely divided basic alum with aqua ammonia containing ammonia in sufficient quantity to react with the aluminum sulphate component of the basic aluminum sulphate constituent of the alum so that the ammonia will combine with the acid radical of the sulphate producing ammonium sulphate and bringing substantially all the alumina in the alum to the form of alumina hydrate.

The second step of the process consists in separating the insoluble alumina hydrate from the soluble sulphates of ammonia and such other sulphates of alkali metal as may be present in the basic alum treated. This separation is readily effected by dissolving out the sulphates, leaving the insoluble alumina hydrate in the finely divided condition of the original basic alum under treatment. The solution of ammonia used will be of such dilution as to dissolve the sulphates as formed in the first step. This degree of dilution is practically necessary to avoid the formation of a solid mass and the impairment of the reaction. It has been found that a solution containing 15% of ammonia is the upper limit of concentration which should be used in treating a basic alum in order to avoid the formation of the solid mass.

The ammonium sulphate separated from the alumina hydrate is then by concentration of the solution crystallized out of the solution and, where sulphates of potash or soda are present in the solution, separated therefrom by well known methods, such as fractional crystallization, and a portion of the crystalline sulphate of ammonia substantially equivalent to that formed by the union of ammonia with the acid radical of the basic sulphate of alumina in the alum is then thoroughly mixed with a portion of the finely divided alumina hydrate sufficient when heated to a proper temperature to unite with the acid radical of the ammonium sulphate, forming an anhydrous aluminum sulphate, with liberation of ammonia gas, which is absorbed in water by well known methods to form aqua ammonia, to be again used in the treatment of additional quantities of basic alum. Where, as may be advisable, the crystallized ammonium sulphate is used in some excess of the quantity which will combine with the alumina hydrate, preferably a sufficient quantity so that the molecular ratio of SO$_3$ to Al$_2$O$_3$ is 3.5, the uncombined ammonium sulphate will be vaporized and may be collected in dust chambers or screen systems and if desired mixed with the ammonium sulphate crystals in the treatment of further quantities of alumina hydrate.

The residual alumina hydrate is of great purity, well adapted for the manufacture of pure aluminum oxide or other valuable products of alumina and the anhydrous aluminum sulphate, produced as described, is also of great purity and of high concentration in its alumina component and especially well adapted for many uses in the arts. The alkali sulphates separated from the alumina hydrate, that is to say, such ammonium sulphate, if any, as is not used in the formation of anhydrous aluminum sulphate with liberation of ammonia gas and the sulphates of potash and soda, if present in the alum are of course valuable products, which may in certain cases be utilized in the preparation of the basic alum or rather of a normal alum from which the basic alum is produced.

By preference and because there is thereby secured a basic alum of great purity and in a desirably fine state of division, the basic alum is manufactured by dissolving a pure normal aluminum alum in water to form an 80% solution and then heating the so prepared solution with preferably an additional amount of alkali sulphate, that is to say, a sulphate or sulphates of potash, soda or ammonia, to a temperature of from 140° C. to 210° C. and at a corresponding pressure, as a result of which treatment a basic alum of the formula, $$X_2SO_4 \cdot 3Al_2O_3 \cdot 4SO_3 \cdot 9H_2O.$$

in which X represents alkali metal or ammonium, is precipitated from the solution, the mother liquor retaining the sulphuric acid separated from the normal aluminum sulphate in the formation of the basic alum and whatever excess of the alkali metal sulphate as is not found combined in the basic alum precipitated. To obtain a basic alum as above described which will contain approximately all of the alumina of the normal alum, it has been found that it is advisable to add to the solution of the normal alum ammonium, potassium or sodium sulphates in quantity approximately equal to the alkali metal sulphates combined with the aluminum sulphate in the normal alum. The excess alkali metal sulphate, and by this term is included the sulphates of ammonia, potassium and sodium, will remain in the mother liquor from which the basic alum is precipitated. The basic alum precipitate formed by this treatment after separation from the mother liquor and washing, is admirably adapted for use in the process and the values contained in the mother liquor may be reclaimed in any convenient manner and in most cases by the employment of the mother liquor containing the sulphuric acid and sulphates of potash or/and sulphates of soda or ammonia in the treatment of ores of alumina in the preparation therefrom of a pure normal alum from which to prepare the basic alum used in the process.

In the treatment of many alumina ores to produce therefrom a normal alum the sulphates of potash or/and sulphates of soda or ammonia separated from the alumina hydrate in the process may also be wholly or in part used in the production from the ore of alumina, of the pure normal alum from which the basic alum is produced as above described.

This process has been especially devised and developed in the treatment of the ore of alumina known as alunite, which ore may be considered as containing its alumina in the form of a basic aluminum potash alum admixed in nature with various contaminating materials, notably silica and iron. In the treatment of such ores it has been found desirable to grind the ore, then roast it at a temperature of from 500° C. to 600° C., then treat the roasted ore with sulphuric acid in sufficient quantity to convert the basic sulphate of alumina into the normal sulphate, then to separate the soluble elements, mainly sulphates of alumina and potash, by dissolving them out, and separating the solution from the gangue matter, then any ferric iron is converted in the solution to ferrous iron and after adding, if necessary, a sufficient quantity of sulphate of potash to bring the proportions of the sulphates of potash and alumina to those existing in the normal alum and this sulphate of potash can be added at any stage of the treatment, a normal potash alum is crystallized from the solution, which will be found free from contaminating iron and other impurities and admirably adapted as a base material for the preparation by the described process of the basic alum. In the treatment of alunite ores the sulphating of the roasted ore by treating it with the mother liquor produced in the preparation of the basic alum is of advantage and economy. This mother liquor will ordinarily be found to contain about ten percent of acid, which has been found to be an ample strength for the acid treatment of the roasted ore and the sulphate of potash also contained in the mother liquor will supply at least in part sulphate of potash, which should be added to that contained in the ore in order to bring the potash contents up to the proper strength.

In the treatment of alunite ore the sulphate of potash separated from the alumina hydrate in the practice of the process will be one of the end products but where ores of alumina containing no potash or an insufficient amount thereof are used in the production of a normal alum and where this alum is a potash alum the sulphate of potash separated from the alumina hydrate is adapted for use in building up from the ore a solution of a normal alum, as is also the potash contained in the mother liquor from which the basic alum is precipitated and the sulphuric acid, concentrated if necessary, contained in the mother liquor, reinforced where necessary with additional sulphuric acid, can be used in converting the alumina in the ore into sulphate of alumina.

What has been said as to the cyclical use of sulphate of potash in the treatment of ores of alumina is equally true as to the possible cyclical use of the sulphates of soda and ammonia where the ores are treated for the production of a normal sodium or ammonium alum or of normal alums in which the sulphate of alumina is combined with two or more of the alkali metal sulphates, in which term is included the sulphate of ammonia.

As an example of the carrying out of the process, starting with a pure normal potash alum as a base material, a solution of potassium sulphate is incorporated with a solution of the normal alum equal in quantity to the potassium sulphate content of the normal alum, the water used in forming the compound solution being preferably the amount required to produce approximately an 80% solution. The solution is then heated to a temperature of from 140° C. to 210° C. and under corresponding pressure preferably to a temperature of 200° C. to cause the formation and precipitation from the solution of a basic potassium alum, having approximately the composition $Al_2O_3$ 31%; $SO_3$ 32%; $H_2O$ 17%; $K_2SO_4$ 20%. This formation and precipitation of the basic alum takes place with great rapidity at a temperature of 200° C. 55% of the sulphuric acid combined with the alumina in the normal alum will be found in the mother liquor from which the basic alum is precipitated, which mother liquor will, under the conditions above given, have an acid strength of about 10%. All of the potassium sulphate not combined with the basic alum will also be found in the mother liquor. The basic alum is then separated from the mother liquor and thoroughly washed, which is easily effected, as it is precipitated in a fine but crystalline state of division. The next step is to treat the basic alum in a closed container, preferably at a temperature of from 90° C. to 100° C. with aqua ammonia containing ammonia in sufficient quantity to react with the acid radical of the basic sulphate of alumina. By preference ammonia is provided in the solution in the proportion of 7 parts by weight of ammonia to 8 parts by weight of the sulphuric acid, combined as basic sulphate of alumina and the aqua ammonia should be provided in such dilution, preferably 10%, that the sulphates resulting from the decomposition of the basic alum are soluble in the residual liquor. The excess ammonium hydroxide which is separated from the aluminum hydroxide is treated with further amounts of basic alum in order to completely neutralize the free ammonium in the solution. This result is obtained by the use of a countercurrent apparatus. The result of the described reaction is to bring all of the alumina contained in the basic alum to the form and state of alumina hydrate, to free the sulphate of potash combined with the basic alum, and to form sulphate of ammonia. Both of the sulphates are soluble and can readily be separated from the insoluble alumina hydrate which is so separated and carefully washed. The alumina hydrate is of such physical condition that it is readily separated and easily washed. The filtered sulphates in solution are then separated from each other most conveniently by progressive concentration and fractional crystallization so as to produce crystallized sulphate of potash and crystallized sulphate of ammonia. The crystallized sulphate of ammonia, to which if necessary may be added additional sulphate of ammonia, is then mixed with a portion of the alumina hydrate equivalent to that produced by the union of the ammonia with the acid radical of the basic sulphate of alumina. The mixture thus produced is then heated in a furnace to a reactive temperature and to obtain the best results the furnace temperature should not be less than 350° C., preferably a temperature of 600° C. being maintained in the furnace, which should not have a temperature in excess of 620° C. The prompt heating of the mixture to a high reactive temperature not only shortens the time of treatment but avoids a difficulty met with in the gradual heating of the mixture owing to the fact that at lower temperatures there occurs what appears to be an incipient fusion of the mixed materials which makes it very difficult to effect an even heating of the mixture and interferes materially with the stirring which it is advisable to maintain. As a result of this heating of the mixture, the sulphuric acid of the ammonium sulphate combines with the alumina hydrate to form an anhydrous sulphate of alumina. The ammonia liberated by this reaction is collected and converted into aqua ammonia, which is used in the treatment of additional charges of basic alum.

Where the normal alum is produced from alumina ores it is practical and desirable that the mother liquor from which the basic alum is precipitated should be used in the treatment of the ores to produce the normal alum, as both the sulphuric acid and sulphate of potash contained in the mother liquor are required in the treatment of the ores where a potash alum is to be produced.

Where the process is to be practiced with an ammonium or sodium alum, the process is essentially the same as that described with regard to the treatment of a potash alum except that in the case of ammonium alum only the proportion of sulphate of ammonia or a slight excess which has been produced by the union of the ammonia in the aqua ammonia with the sulphuric acid of the basic aluminum sulphate, is used for admixture with a portion of the alumina hydrate. The remaining sulphate of ammonia would of course be used in the treatment of additional quantities of alumina ore for the production of the normal ammonium alum.

The temperatures which have been given in the above specification and which are stated in the claims are those found to give the best and most efficient results, though it will be obvious that results the same in kind will be produced at higher or lower temperatures. This should not be understood as limiting the scope of the claims to the exact temperatures mentioned.

As an illustration of the improved process as applied to the treatment of an alunite ore, reference is made to the flow sheet, constituting a part of this specification.

Having now described the invention, what is claimed as new and is desired to be secured by Letters Patent, is:

1. The method of treating basic alums for the recovery therefrom of hydrated alumina and valuable sulphates which consists in treating a finely divided basic alum with an aqueous solution of ammonia containing ammonia in sufficient quantity to combine with the acid radical of the basic sulphate of alumina component of the basic alum, separating the insoluble hydrated alumina from the soluble salts including ammonium sulphate formed in the described treatment of the alum, separating the ammonium sulphate from other alkali metal sulphates if present and crystallizing the ammonium sulphate by concentration of its solution, then mixing a quantity of crystallized ammonium sulphate approximately equivalent to that formed by the union of ammonia with the acid radical of the basic sulphate of alumina with a sufficient quantity of the hydrated alumina to react with the ammonium sulphate upon heating said mixture to a reactive temperature in a furnace maintained at a temperature of from 500° C. to 620° C. to effect the formation of an anhydrous sulphate of alumina with liberation of ammonia and absorbing the ammonia in water and re-cycling the resulting solution for treatment of further quantities of basic alum, in accordance with the first mentioned step of the process.

2. The method of claim 1 as carried out in the treatment of a basic potassium alum in which the resulting soluble salts of ammonia and potash after separation from the hydrated alumina are separated from each other by fractional crystallization.

3. The method of claim 1 as carried out in the treatment of a basic sodium alum in which the resulting soluble salts of ammonia and soda after separation from the hydrated alumina are separated from each other by fractional crystallization.

4. The method of producing alumina hydrate and other valuable products from normal alums, which consists in forming an aqueous solution of the normal alum, heating the alum solution thus formed to a temperature of frome 140° C. to 210° C. and at corresponding pressure to effect the formation and precipitation of a basic alum from which has been eliminated from the aluminum sulphate constituent approximately 55% of the sulphuric acid combined with the alumina in the normal alum, then treating the basic alum precipitate with aqua ammonia containing sufficient ammonia to react and combine with the acid radical of the basic sulphate of alumina and liberate the combined alumina as alumina hydrate, then separating the insoluble alumina hydrate from the solution, then separating the ammonium sulphate from alkali metal sulphates that may be present in the solution by fractional crystallization of the ammonium sulphate, then mixing a quantity of the produced ammonium sulphate approximately equivalent to that produced by the treatment of the basic alum with aqua ammonia with a reactive percentage of the alumina hydrate, heating the mixture to a reactive temperature in a furnace maintained at a temperature of from 500° C. to 620° C. to effect the formation of an anhydrous aluminum sulphate and the liberation of the ammonia gas and absorbing the ammonia in water and re-cycling the resulting solution for treatment of further quantities of basic alum, in accordance with the first mentioned step of the process.

5. The method of treating ores or compounds of alumina for the production therefrom of hydrated alumina and other valuable products, which consists in treating said ores in such manner as to form therefrom a normal alum with elimination of iron and other contaminating ingredients of the ore, forming an aqueous solution of the alum and heating it to temperatures of from 140° C. to 210° C. in order to form therefrom a precipitate consisting of a finely divided basic alum and a mother liquor containing approximately 55% of the sulphuric acid combined with alumina in normal alum, then treating the basic alum precipitate with an aqueous solution of ammonia containing ammonia in sufficient quantity to react with the acid radical of the basic sulphate of alumina so as to form from the said basic alum hydrated alumina and a solution of ammonia sulphate and of such other alkali metal sulphates as may have entered into the composition of the basic alum, then concentrating the sulphate solution to effect crystallization of the ammonium sulphate, then mixing a quantity of the ammonium sulphate crystals containing ammonia in approximately the amount combined with the acid radical of the basic sulphate of alumina in the treatment of the basic alum with aqua ammonia, mixing these ammonium sulphate crystals with a reactive percentage of the alumina hydrate prepared as stated, then heating the mixture to a reactive temperature lying between 500° C. and 620° C. to effect the formation of an anhydrous aluminum sulphate and the liberation of the ammonia and absorbing the ammonia in water and re-cycling the resulting solution for treatment of further quantities of basic alum, in accordance with the first mentioned step of the process.

6. The method of claim 5 as carried out in the treatment of alunite ores.

LOUISE D. SANDERS,
Administratrix of the Estate of Walter Murray Sanders, Deceased.